July 25, 1933.  H. R. GOTTHARDT  1,919,837
CONVEYER
Filed Sept. 16, 1931  3 Sheets-Sheet 1
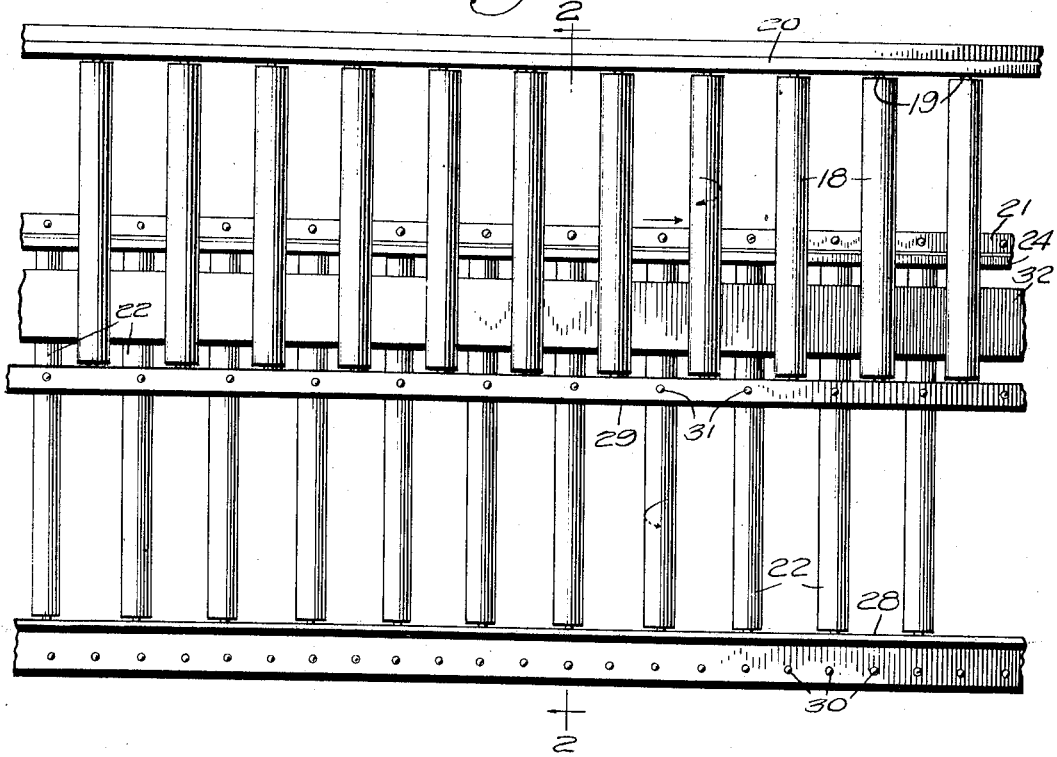
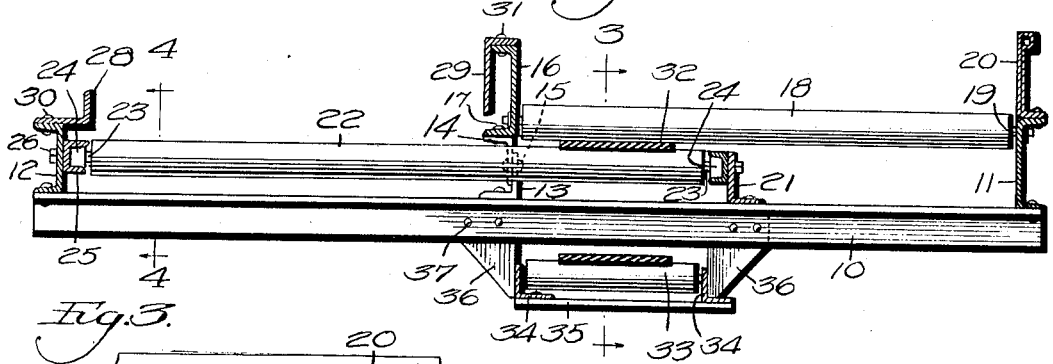
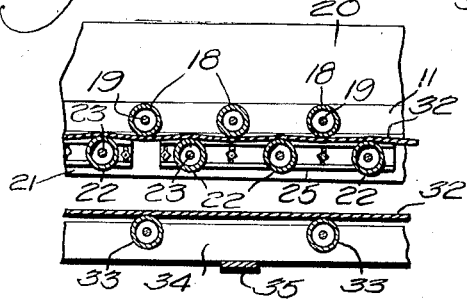
Inventor
HENRY R. GOTTHARDT
By C. R. Parker Jr.
Attorney July 25, 1933.                H. R. GOTTHARDT                1,919,837
                                  CONVEYER
                       Filed Sept. 16, 1931          3 Sheets-Sheet 2
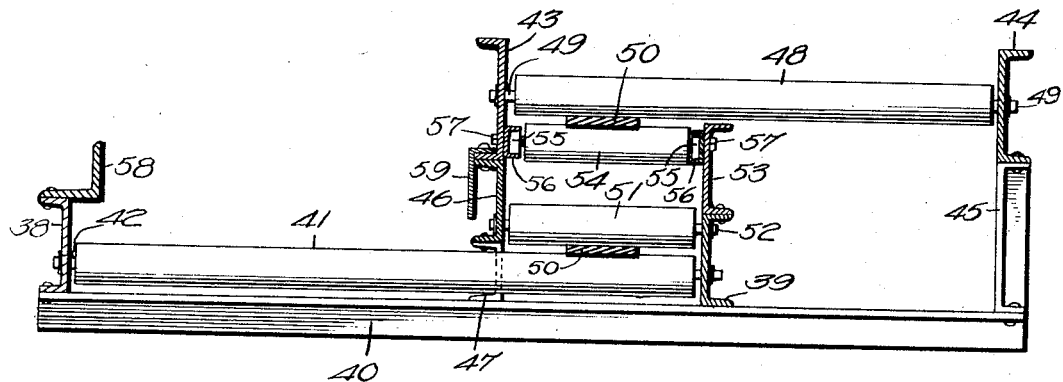
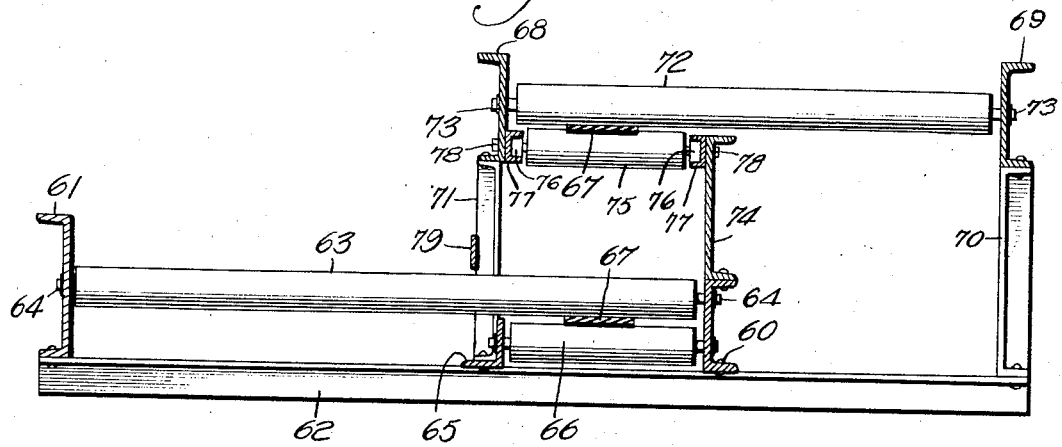
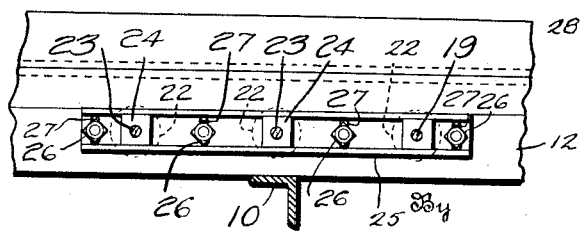
Inventor
HENRY R. GOTTHARDT
C. L. Parker
Attorney July 25, 1933.  H. R. GOTTHARDT  1,919,837
CONVEYER
Filed Sept. 16, 1931   3 Sheets-Sheet 3

Inventor
HENRY R. GOTTHARDT

By  C. L. Parker Jr.
Attorney

Patented July 25, 1933

1,919,837

UNITED STATES PATENT OFFICE

HENRY R. GOTTHARDT, OF LOUISVILLE, KENTUCKY, ASSIGNOR TO LOGAN CO. INC., OF LOUISVILLE, KENTUCKY, A CORPORATION OF KENTUCKY

CONVEYER

Application filed September 16, 1931. Serial No. 563,165.

This invention relates to conveyers, and more particularly to power driven roller conveyers.

An important object of the invention is to provide a plurality of power driven or live roller conveyers in which a single driving element is employed for effecting rotation of the rollers of the several conveyers.

A further object is to provide a conveying apparatus of the character referred to wherein the rollers of the several conveyers are arranged in driving engagement with a single endless driving member to be rotated thereby.

A further object is to provide a conveying apparatus wherein economy in manufacture and the space required for conveying apparatus is reduced by the provision of a novel arrangement wherein two or more live roller conveyers in different adjacent vertical planes are driven from a single endless driven member.

A further object is to provide a conveying apparatus of the character referred to wherein two live roller conveyers are provided adjacent and vertically offset from each other and driven by a single endless member, and wherein the inventive idea lends itself readily to the provision of a pair of adjacent conveyers operative for effecting the movement of articles either in the same or in opposite directions.

Other objects and advantages of the invention will become apparent during the course of the following description.

Figure 7:
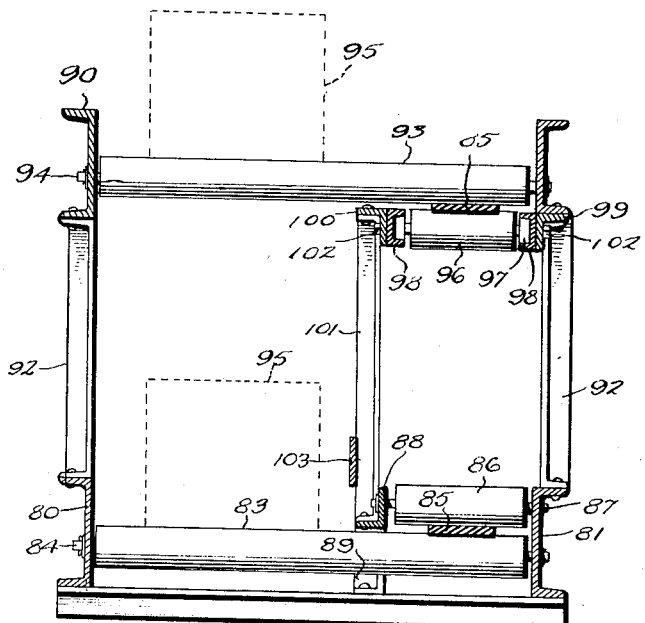
Figure 8:
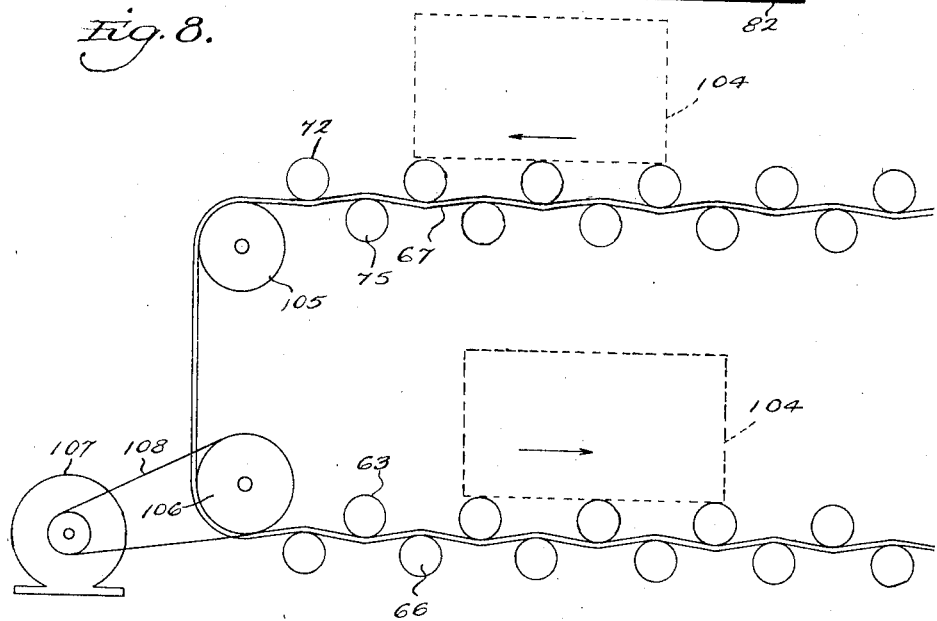

In the drawings I have shown several embodiments of the invention. In this showing, Figure 1 is a plan view of a portion of a conveyer embodying the invention, Figure 2 is a transverse sectional view on line 2—2 of Figure 1, Figure 3 is a vertical sectional view on line 3—3 of Figure 2, Figure 4 is a detail sectional view on line 4—4 of Figure 2 showing a tension adjusting means, Figure 5 is a sectional view similar to Figure 2 showing a modified form of the apparatus, Figure 6 is a similar view illustrating a further modification, Figure 7 is a similar view illustrating an added modification, and, Figure 8 is a diagrammatic view.

Referring to Figures 1 to 4 inclusive the numeral 10 designates a plurality of transverse tie rails, preferably formed of angle iron, and arranged at suitable intervals along the apparatus, as will become apparent. The tie rails are arranged on suitable supporting means of any conventional type (not shown). A pair of side rails 11 and 12 is arranged at opposite ends of the tie rails 10, and the side rails are preferably formed of channel iron, as shown in Figure 2.

A plurality of angle irons 13 are supported upon and secured to the rails 10 in a line parallel to and substantially equidistantly spaced from the side rails 11 and 12. The formation of the center angle iron in a plurality of sections as described is employed to provide spaces for rollers to be referred to to extend across the vertical plane of the center rail, as will become apparent. A similar series of angle iron sections 14 is secured to the sections 13, as at 15, and the upper faces of the angle iron sections 14 lie in a common horizontal plane. A channel iron center rail 16 has its lower base secured to the upper bases of the angle irons 14, as at 17. A plurality of conveyer rollers 18 is arranged between the rails 11 and 16 and these rails support shafts 19 upon which the rollers 18 are journalled. The supporting of the rollers 18 on the shafts 19 is accomplished by ball bearing mountings in accordance with standard or any desired practice, forming no part of the present invention. The portion of the rail 16 projecting above the bed of the rollers 18 forms a guide rail for these rollers while an outside guide rail 20 forms a guide for the opposite side of the conveyer and is secured to the rail 11.

A supporting rail 21 extends parallel to the rails 11 and 13 beneath and intermediate the ends of the rollers 18 and is secured to the tie rails 10. The channel iron 12 cooperates with the rail 21 to support a plurality of conveyer rollers 22 similar to the rollers 18. The rollers 22, if desired, may be vertically adjustable for a purpose to be described, and may be adjustable either singly or in groups. For the purpose of illustration, means are illustrated for vertically adjusting the rollers 22 in groups of three, but it will become apparent that the invention is not in any way limited to the particular adjusting means referred to. The rollers 22 are rotatable about shafts 23, and the ends of these shafts are held stationary in end blocks 24 mounted in channel iron carriers 25. These carriers are bolted as at 26 to the respective rails 12 and 21, and the bolts extend through slots 27 in the carriers 24 whereby fastening of the bolts 26 permits the carriers and consequently the rollers 22, to be vertically adjusted. The rollers 22 constitute a second conveyer bed laterally offset from the rollers 18, and rails 28 and 29 are secured as at 30 and 31 to the rails 12 and 16 to serve as guard rails for the second conveyer.

The rollers 18 and 22 form a pair of live roller conveyers which are adapted to be driven from a single source of power through a single power transmitting element. Referring to Figures 1, 2 and 3, the numeral 32 designates an endless belt the upper run of which operates against the bottoms of the rollers 18 and against the tops of the rollers 22. When the belt is properly tensioned, and is driven from a suitable source of power (not shown) it will be apparent that its upper run rotates the rollers 18 in one direction and the rollers 22 in the opposite direction, and accordingly the conveyers are adapted to move articles in different directions.

The lower run of the belt 32 is supported upon a plurality of rollers 33 having their shafts journalled in angle iron side rails 34. These rails are secured together by small tie plates 35 arranged at intervals therealong. The rails 34 are supported in proper position by gusset plates 36 secured as at 37 to the tie rails 10.

A somewhat modified form of the invention is disclosed in Figure 5, wherein the two conveyers are adapted to move articles in the same direction. A pair of channel iron rails 38 and 39 supported upon cross rails 40 similar to the rails 10 previously described. Conveyer rollers 41 are rotatably mounted on shafts 42 having their ends projecting through the rails 38 and 39 and fixed against rotation with respect thereto. A pair of rails 43 and 44 is mounted above the rails 38 and 39 and offset laterally with respect thereto. The rails 44 are supported by the cross rails 40 by suitable supporting members 45. The rail 43 has its base flange supported by and secured to the upper flange of a channel rail 46, and this rail, in turn, is supported upon the cross rail 40 by small channel rails 47 arranged between the rollers 41.

A plurality of conveyer rollers 48 is arranged between the conveyer rollers 43 and 44, and these rollers carry shafts 49 upon which the rollers 48 are journalled. It will be apparent that the rails 41 and 48 project laterally from each other to form two offset conveyer beds.

An endless belt 50 has its upper run in engagement with the bottoms of the rollers 48 and its lower run in engagement with the tops of the rollers 41. Idler rollers 51 are journalled on shafts 52 having their ends carried respectively by the rails 39 and 46. Another rail 53 is arranged above and supported by the rail 39, and a plurality of idler rollers 54 is mounted between the rails 43 and 53. The idler rollers 54 may be vertically adjustable, and accordingly have been shown as having their shafts extending into blocks 55 arranged in carriers 56 and these carriers are vertically adjustable by loosening bolts 57, similar to the bolts 26 previously described. It will be apparent that the idler rollers 51 also may be vertically adjustable if desired. Inasmuch as the two runs of the belt 50 move in opposite directions and contact with relatively opposite sides of the rollers 41 and 48, it will be apparent that these rollers rotate in the same direction, and accordingly articles on the two conveyers also will be rotated in the same direction. The upper portions of the rails 43 and 44 act as guard rails for the conveyer rollers 48. Guard rails 58 and 59 also are provided for the rollers 41, and these guard rails are secured respectively to the rails 38 and 43.

In the modification of the invention shown in Figure 6, an arrangement quite similar to that shown in Figure 5 is employed, except that the two conveyers are adapted to move articles in opposite directions. Longitudinal rails 60 and 61 are mounted upon and secured to transverse rails 62, similar to the rails 10 and 40 previously described. Conveyer rollers 63 have their shafts 64 mounted in the rails 60 and 61 to be supported thereby. A channel iron rail 65 cooperates with the rail 60 to form supporting means for idler rollers 66, and these rollers maintain the lower run of a belt 67 in engagement with the bottoms of the rollers 63.

Rails 68 and 69, similar to the rails 60 and 61, are mounted above the latter rail and offset therefrom. The rails 69 are secured upon the upper ends of supports 70 having their lower ends secured to the cross rails 60, while the rails 68 are similarly secured to the upper ends of supports 71 having their lower ends secured to the angle iron rail 65. A second conveyer comprising rollers 72 is arranged between the rails 68 and 69. The rollers 72 are journalled upon shafts 73 carried at their ends by the rails 68 and 69.

A rail 74 is supported by and projects upwardly from the rail 60 and the rails 68 and 74 are adapted to support idler rollers 75 by which the upper run of the belt 67 is maintained in engagement with the bottoms of the rollers 72. The rollers 75 may be vertically adjustable, and accordingly have been illustrated as having their shafts mounted at their ends in blocks 76 arranged in carriers 77. These carriers are preferably slotted in the same manner as the carriers 25, and bolts 78 pass through the slots of the carriers and the adjacent rails to provide means for securing the rollers 74 in adjusted position.

The upwardly projecting portions of the rails 68 and 69 operate as guide rails for the conveyer rollers 72 while the similar portion of the rail 61 acts as a guide rail for one side of the conveyer rollers 63. A guide rail 79 is provided for the opposite side of the conveyer bed defined by the rollers 63 and is secured to the supports 71.

In Figure 7 of the drawings a still further modification is illustrated, in which the two conveyers are arranged one above the other, but have their ends clear of any obstructions incidental to the driving means, whereby articles readily may be fed to and discharged from either conveyer. Referring to Figure 7, the numerals 80 and 81 designate a pair of parallel side channel rails connected at spaced intervals by angle iron cross rails 82. Lower conveyer rollers 83 are journalled on shafts 84 fixed at their ends to the rails 80 and 81, and these rails project a substantial distance above the conveyer rollers, as shown.

An endless driving belt 85 has its lower run contacting with the tops of the rollers 83 adjacent one end thereof, and idler or tension rollers 86 arranged between certain of the rollers 83 are adapted to maintain the endless belt in driving engagement therewith. The rollers 86 are mounted on shafts 87, and one end of these shafts is supported by the side rail 81 while the other ends of the shafts are supported in an auxiliary angle iron rail 88. Supports 89 are provided for the rail 88 and are mounted upon the cross rails 82.

A second pair of channel iron side rails 90 and 91 is arranged above the rails 80 and 81, and are supported in position by suitable supports 92. A second conveyer is supported between the rails 90 and 91. This conveyer comprises rollers 93, similar to the rollers 83, journalled on shafts 94 carried at their ends by the rails 90 and 91. Articles or packages 95 are adapted to travel on either conveyer, and it will be noted that the space between the rails 80 and 88 is ample to permit the passage of the articles on the lower conveyer 83.

The upper run of the belt 85 contacts with the bottoms of the rollers 93 and is held in position against such rollers by idler or tension rollers 96. The shaft of the roller 96 extends into blocks 97 arranged in carriers 98. These carriers are arranged against the inner faces of angle iron rails 99 and 100, the former of which is secured to the upper end of the supports 92. The angle iron 100 is supported above the rail 88 by a plurality of supports 101, and the carriers 98 are vertically adjustable by proper manipulation of nuts 102, this adjustment being similar to the adjustment of the carriers 25 described in connection with the form of the invention shown in Figures 1 to 4 inclusive.

The rails 90 and 91 project upwardly a substantial distance above the rollers 93 to provide guide rails for the upper conveyer, while the rail 88 acts as a guide rail for one side of the lower conveyer. A guide rail for the inner side of the lower conveyer is provided in the form of a strip 103.

In Figure 8 of the drawings the diagrammatic view of the driving means for the conveyer shown in Figure 6 is illustrated, although the application of the driving system to the other forms of the invention is substantially identical. As shown, the upper run of the belt 67 travels between the conveyer and idler rollers 72 and 75, while the lower run of the belt runs between the conveyer rollers 63 and idler rollers 66. Packages 104 are conveyed in opposite directions on the two conveyers formed by the rollers 63 and 72. At the extremities of the two conveyers, the endless belt passes around upper and lower pulleys 105 and 106. A source of power is illustrated in the form of an electric motor 107 transmitting power to the pulley 106 by a drive belt or chain 108. It will be apparent that the showing in Figure 8 is merely diagrammatic, and that any source of power may be employed together with any suitable means for transmitting the power to the endless belt. It also will be apparent that substantially the same drive means is employed for the various systems illustrated except that in the form of the invention shown in Figures 1 to 4 inclusive, the upper and lower runs of the belt are sufficiently close together to permit the elimination of one of the pulleys 105 or 106.

The operation of the apparatus will be apparent from the foregoing description. Either form of the apparatus effects a substantial saving in floor space due to the fact that a plurality of conveyers may be arranged without any waste space therebetween. In this connection, it will be noted that while each form of the invention has been illustrated as comprising two conveyers, the lower conveyer rollers, in either case, may be extended to form a third conveyer. For example, the rollers 22 shown in Figure 2 may be extended through the rail 11 to the opposite side of the apparatus to duplicate the conveyer portion of the rollers 22 whereby two lower conveyers and one upper conveyer would be provided.

Moreover, in each case, a single flexible driving element is employed for effecting rotation of all of the conveyer rollers, thus effecting a saving in power and in the power transmitting means. Moreover, the form of the invention shown in Figures 1 to 4 inclusive is particularly practicable from the standpoint of economy in manufacture since no separate idler rollers are necessary for maintaining the belt in engagement with two sets of conveyer rollers, the rollers of each set serving as the idler rollers for maintaining the belt in driving engagement with the other set. The forms of the invention shown in Figures 5 and 6 are particularly adapted for use where it is desired to have the two conveyers offset vertically to a greater extent than is possible with the structure shown in Figure 2. The form of the apparatus shown in Figure 5 also is particularly adapted for use where it is desired to convey packages or articles in the same direction on the two conveyers. Inasmuch as the two runs of the belt in the form of the invention shown in Figure 6 run in opposite directions and contact with the bottoms of the respective sets of conveyer rollers, it will be apparent that these rollers will be driven in opposite directions as in the apparatus shown in Figures 1 to 4 inclusive.

The form of the invention shown in Figure 7 is particularly adapted for use where floor space is quite limited, and it is desired to provide two conveyers for moving articles in the same direction. In this form of the invention, the conveyer rollers extend laterally in the same direction from their point of engagement with the endless driving member, and both ends of both conveyers are open and are free from alinement with any of the power transmitting means so as to facilitate the entrance of the package into the conveyers and their discharge therefrom. While the upper and lower runs of the belts run in opposite directions, they engage relatively opposite sides of the conveyer rollers and accordingly these rollers are rotated in the same direction.

From the foregoing it will be apparent that an important feature of the invention lies in the provision of an endless conveyer driving element having its upper and lower runs arranged in a common vertical plane, with the rollers of each conveyer arranged with one end overlapping the plane of the endless driving member to be actuated thereby. As to the form of the invention shown in Figures 1 to 4 inclusive it is also an important feature of the invention to eliminate the use of idler rollers for maintaining the belt in engagement with either set of conveyer rollers, since the rollers of each set act as idler rollers for the other set, as previously stated.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. Apparatus of the character described comprising a pair of horizontal conveyers each having load supporting rollers, a common flexible driving element having its runs vertically arranged one above the other, the rollers of each conveyer having one end overlapping the vertical plane of the flexible driving element and frictionally engaged therewith to be driven thereby, the other end portions of the rollers extending a substantial distance laterally from the vertical plane of the driving element from opposite sides thereof, and idler rollers operating against said driving element for maintaining it in frictional engagement with the first named portions of said rollers.

2. Apparatus of the character described comprising a flexible driving belt having an upper run and a lower run, a conveyer comprising a plurality of load supporting rollers having one end portion contacting with the upper face of one run of the belt, tension rollers engaging the lower side of said run of the belt, a second conveyer comprising a plurality of load supporting rollers having one end portion contacting with the upper face of the other run of the belt, and tension rollers engaging the lower face of said last named run of the belt, the other end portions of the conveyer rollers extending laterally in opposite directions a substantial distance beyond said tension rollers.

3. Apparatus of the character described comprising a flexible driving belt having an upper run and a lower run, a conveyer comprising a plurality of load supporting rollers having one end portion contacting with one face of one run of the belt, tension rollers engaging the opposite side of said run of the belt, a second conveyer comprising a plurality of load supporting rollers having one end portion contacting with one face of the other run of the belt, and tension rollers engaging the opposite face of said last named run of the belt, the other end portions of said conveyer rollers extending laterally from opposite sides of the vertical plane of said belt a substantial distance beyond said tension rollers.

HENRY R. GOTTHARDT.